UNITED STATES PATENT OFFICE 2,332,489

FABRICATION OF CRYSTALLINE POLYMERS

Robert C. Reinhardt and Leonard C. Chamberlain, Jr., Midland, Mich., assignors to The Dow Chemical Company, Midland, Mich., a corporation of Michigan No Drawing. Application April 12, 1941,
Serial No. 388,268

5 Claims. (Cl. 18—54)

This invention relates to a method of fabricating crystalline polymers and to the article thereby obtained.

By the term "crystalline polymer," as used in the present specification and claims, is meant those solid polymerization products, whether polymers, co-polymers, inter-polymers, or otherwise named which normally exhibit characteristic X-ray diffraction patterns. One important group of these crystalline polymers may be obtained by polymerizing monomeric vinylidene chloride, alone or in combination with one or more other polymerizable materials such as vinyl acetate, styrene, the esters of acrylic or methacrylic acid, allyl and related esters of carboxylic or inorganic acids, unsaturated ethers, etc.

It has been disclosed in United States Letters Patent No. 2,183,602 that certain polymers, which are here defined as crystalline polymers, can be put into a physical state in which they may be deformed plastically at relatively low pressures by heating them to a temperature between their softening point and their decomposition temperature, and thereafter rapidly chilling the fused mass, as by immersing it in cold water. The so-treated mass is referred to as being in the "supercooled" state. While in the supercooled state, crystalline polymers have little strength, and any few crystals which may be present are indicated by X-ray diffraction patterns to have a random arrangement. If the supercooled mass is allowed to stand long enough, or if it is plastically deformed, it crystallizes or "sets," losing its ability to be further deformed easily at room temperature and gaining considerable strength. From this time on, the polymer continues to exhibit crystallinity until such time as it is again heated to above its softening point.

If the supercooled polymer, obtained by the method above described, is subjected to plastic deformation (as by stretching or rolling) at room temperature, an elongation of the strand or sheet by a factor of over 100 per cent (commonly, 400 per cent) is obtained, accompanied by oriented crystallization of the supercooled polymer. The orientation is largely mono-directional and, in the case of stretching, usually parallel to the major axis of the stretched article. Such oriented articles are claimed in United States Letters Patent No. 2,233,442.

Crystalline polymers which have their crystals oriented as above described have far greater strength in the direction of that orientation than the same crystalline polymer in an unoriented state, but they are relatively weak in the other direction. Thus, a linearly oriented monofilament may be very strong along its major axis and have very little transverse strength. When such filaments are used, for example, as leaders for fly fishing, they may break when the fly is snapped, due to low shear strength.

It is, accordingly, among the objects of the invention to provide a strand of a normally crystalline polymer wherein the crystals are oriented so as to provide both a high longitudinal strength and a high transverse, or shear strength. Related objects will appear as the description proceeds.

According to the present invention, the foregoing and related objects are attained by providing or inducing, in a strand of a normally crystalline polymer, orientation of the crystals helical to the longitudinal axis of the strand. Such orientation has a longitudinal component and a transverse component and provides strength in both directions.

In carrying out the method of the invention, there is provided in strand form a supercooled mass of a normally crystalline polymer, which is then twisted, preferably while any tendency of the strand to decrease its length is rendered ineffective, so that the supercooled polymer is caused to crystallize, and a spiral or helical orientation of the crystals about the central axis of the strand results. The tendency of the strand to decrease its length may be counteracted by maintaining the original strand length by limited tension, or by stretching.

The term "twist" is employed herein as having the mechanical meaning of torsional stress as applied to a strand or other shaped body of a crystalline polymer. The term is not used in the same sense as it is commonly employed in the textile art wherein "twisting" means uniting a plurality of filaments by winding them together to form a thread.

The following example illustrates the practice of the invention:

A composition composed of 93 per cent of a co-polymer of 90 percent vinylidene chloride and 10 percent vinyl chloride, and with 7 percent of di-(alpha-phenylethyl) ether as a plasticizer, was extruded at about 180° C. (about 15 degrees above its softening point) through an orifice 0.067 inch in diameter. The strand was chilled in cold water to supercool the polymer, and was then concurrently stretched and twisted until substantially all of the plastic flow of which it was capable had been taken up and the polymer had crystallized. The strand had a tensile strength of 42,000 pounds per square inch, and a knot strength of 30,000 pounds per square inch, whereas a strand of like diameter, made from the same composition, but oriented longitudinally rather than helically, had a tensile strength of 45,000 pounds and a knot strength of only 22,000 pounds. The new, helically oriented crystalline strand was substantially as strong as the straight stretched strand, and had a much improved shear strength, as indicated by the improvement of strength of a strand having an overhand knot therein.

It is to be understood that, while the invention has been described with respect to the twisting and stretching of a single strand, it may be applied to the concurrent treatment of several strands in the same manner. A plurality of wholly or partially twisted strands may be twisted together to make a thread, string or rope wherein the strands have the advantageous properties here described. The twisted strands here described may be treated to provide helical orientation through part of their length and simply stretched to provide longitudinal orientation through the balance of their length if desired.

Although the invention has been described with particular reference to a normally crystalline vinylidene chloride polymer, it is not to be limited thereto; the principle of the invention is as readily applicable to any polymers which are crystalline, as herein defined.

We claim:

1. The method which comprises twisting a supercooled strand of a normally crystalline vinylidene chloride polymer while rendering ineffective any tendency of the strand to decrease its length so that the polymer is crystallized and helical orientation of the crystals about the axis of the strand, at least through a portion of its length, is provided.

2. The method which comprises twisting a supercooled strand of a normally crystalline vinylidene chloride polymer while maintaining at least the original length of said strand by tension to crystallize the polymer and to provide helical orientation of the crystals about the axis of the strand, at least through a portion of its length.

3. The method which comprises twisting a supercooled strand of a normally crystalline vinylidene chloride polymer while stretching the same, to crystallize the polymer and to provide helical orientation of the crystals about the axis of the strand, at least through a portion of its length.

4. The method which comprises providing a supercooled strand of a normally crystalline vinylidene chloride polymer, and stretching the strand while twisting the same, to crystallize the polymer and to provide helical orientation of the crystals about the axis of the strand, at least through a portion of its length.

5. A twisted strand of a normally crystalline vinylidene chloride powder, wherein the crystals are oriented helically about the axis of the strand, substantially identical with the product obtained by the method of claim 1.

ROBERT C. REINHARDT.
LEONARD C. CHAMBERLAIN, Jr.